United States Patent
Davis et al.

(10) Patent No.: US 10,683,395 B2
(45) Date of Patent: Jun. 16, 2020

(54) DUAL-CURABLE SEALANT COMPOSITION

(71) Applicant: BASF SE, Ludwigshafen am Rhein (DE)

(72) Inventors: John Michael Davis, Eden Prairie, MN (US); Ralph Dieter Maier, White Plains, NY (US); Karl Matos, Sewickley, PA (US); Kevin M. Neigh, Butler, PA (US); Kristin Schroeder, Princeton, NJ (US)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 16/091,410

(22) PCT Filed: Apr. 7, 2017

(86) PCT No.: PCT/US2017/026525
§ 371 (c)(1),
(2) Date: Oct. 4, 2018

(87) PCT Pub. No.: WO2017/177095
PCT Pub. Date: Oct. 12, 2017

(65) Prior Publication Data
US 2019/0153163 A1 May 23, 2019

Related U.S. Application Data

(60) Provisional application No. 62/319,531, filed on Apr. 7, 2016.

(51) Int. Cl.
*C08G 75/04* (2016.01)
*C09K 3/10* (2006.01)
(Continued)

(52) U.S. Cl.
CPC .............. *C08G 75/04* (2013.01); *C08K 3/346* (2013.01); *C08L 81/02* (2013.01); *C08L 81/04* (2013.01);
(Continued)

(58) Field of Classification Search
CPC .............. C08G 75/045; C08G 2190/00; C08G 2170/00; C09K 3/1012; C09K 2200/026; C09J 181/02; C08L 81/02; C08L 81/04
See application file for complete search history.

(56) References Cited

U.S. PATENT DOCUMENTS

2009/0247720 A1* 10/2009 Wang .................... C08G 18/10
528/7

FOREIGN PATENT DOCUMENTS

| EP | 0 552 550 A3 | 9/1993 |
| GB | 2330145 A | 4/1999 |
| WO | 2015/148319 A1 | 10/2015 |

OTHER PUBLICATIONS

International Search Report and Written Opinion from counterpart International Patent Application No. PCT/US2017/026525, dated Jul. 7, 2017.
(Continued)

*Primary Examiner* — Shane Fang
(74) *Attorney, Agent, or Firm* — DLA Piper LLP US

(57) ABSTRACT

A dual-curable sealant composition includes a polysulfide having an —SH group, a metal oxide catalyst, and an alkylborane amine catalyst. A cured sealant is also formed from the dual-curable sealant composition. Moreover, a dual-cured sealant is formed that includes the polymerization product of the polysulfide reacted in the presence of the metal oxide catalyst and the alkylborane amine catalyst. Further, a dual-curable sealant system includes a first component including the polysulfide and the alkylborane amine catalyst and a second component including the metal oxide
(Continued)

catalyst. An article is formed that includes a substrate and the cured sealant disposed on the substrate. Even further, a method of forming the dual-curable sealant composition includes the steps of providing the polysulfide, the alkylborane amine catalyst, and the metal oxide catalyst, and combining the polysulfide, the alkylborane amine catalyst, and the metal oxide catalyst to form the dual-curable composition.

20 Claims, 1 Drawing Sheet

(51) Int. Cl.
- *C08L 81/02* (2006.01)
- *C08L 81/04* (2006.01)
- *C08K 3/34* (2006.01)
- *C09J 11/04* (2006.01)
- *C09J 181/02* (2006.01)

(52) U.S. Cl.
CPC ............. *C09J 11/04* (2013.01); *C09J 181/02* (2013.01); *C09K 3/1012* (2013.01); *C08G 2170/00* (2013.01); *C08G 2190/00* (2013.01); *C09K 2200/026* (2013.01); *C09K 2200/0239* (2013.01); *C09K 2200/0458* (2013.01); *C09K 2200/0488* (2013.01); *C09K 2200/0682* (2013.01)

(56) References Cited

OTHER PUBLICATIONS

International Preliminary Report on Patentability from counterpart International Patent Application No. PCT/US2017/026525, dated Oct. 18, 2018.
Communication pursuant to Article 94(3) EPC from counterpart European Patent Application No. 17 720 311.4 dated Feb. 5, 2020.

\* cited by examiner

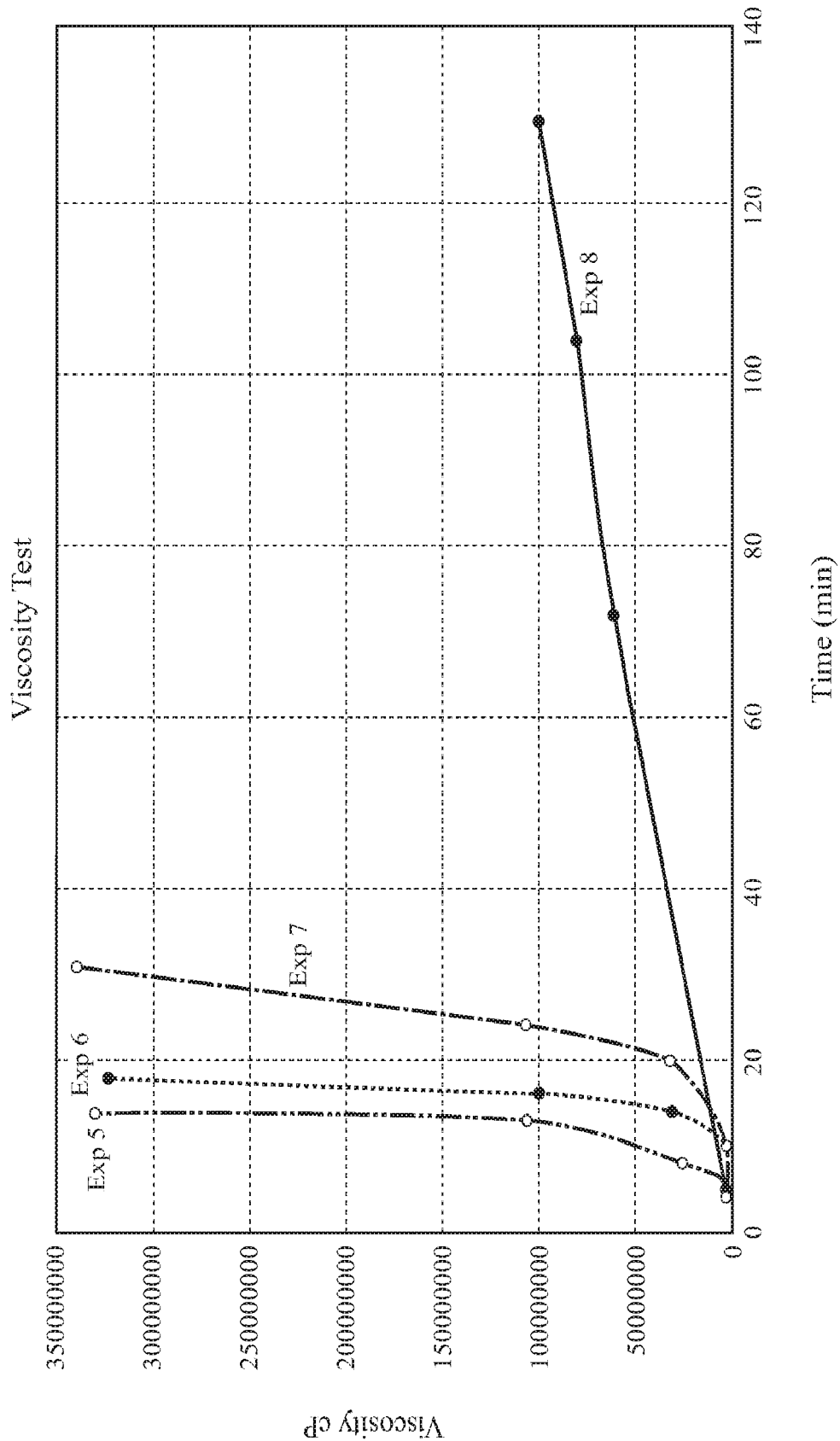

DUAL-CURABLE SEALANT COMPOSITION

FIELD OF THE DISCLOSURE

This disclosure generally relates to a dual-curable sealant composition. More specifically, this disclosure relates a dual-cure sealant composition that includes a polysulfide having an —SH group, a metal oxide catalyst, and an organoborane amine catalyst.

BACKGROUND

Polysulfide compositions in liquid and curable form are known in the art and have been used in a variety of industries. Typically, polysulfides are cured by an oxidoreduction reaction wherein manganese dioxide is used to cure the polysulfides over a number of days. However, this long curing time increases production times and costs and reduces efficiency.

The use of sealants in the manufacture or maintenance of aircraft has previously been a very complex process. The reason for this is the numerous joints having sealants, where sealants that often have very long processing times of 12 to 60 hours must be used. These methods typically require an extremely long time for complete curing and have required a very long tack-free time in the past in proportion to the length of the processing time. For example, an interlayer sealant of class C for the aviation field typically takes 60 to 70 days to achieve a Shore A hardness of 30 if the processing time is 60 hours. Furthermore, conventional type A and B sealants, which are usually applied over a surface or in the form of a bead for coating bolts, rivets or other structural elements typically need 2 to 5 hours to become tack-free if the processing time is 30 minutes, and typically take greater than 24 hours to achieve a Shore A hardness of 30. Therefore, there remains an opportunity for improvement.

BRIEF DESCRIPTION OF THE FIGURES

Other advantages of the present disclosure will be readily appreciated, as the same becomes better understood by reference to the following detailed description when considered in connection with the accompanying drawings wherein:

FIG. 1 is a graph that shows that viscosity as a function of time of various Examples.

SUMMARY OF THE DISCLOSURE

This disclosure provides a dual-curable sealant composition that includes a polysulfide having an —SH group, a metal oxide catalyst, and an alkylborane amine catalyst. Moreover, this disclosure provides a cured sealant formed from the dual-curable sealant composition, a dual-cured sealant including the polymerization product of the polysulfide reacted in the presence of the metal oxide catalyst and the alkylborane amine catalyst, a dual-curable sealant system including a first component including the polysulfide and the alkylborane amine catalyst and a second component including the metal oxide catalyst. This disclosure also provides an article including a substrate and the cured sealant disposed on the substrate. This disclosure also provides a method of forming the dual-curable sealant composition wherein the method includes the steps of providing the polysulfide, the alkylborane amine catalyst, and the metal oxide catalyst, and combining the polysulfide, the alkylborane amine catalyst, and the metal oxide catalyst to form the dual-curable composition. This disclosure further provides a method of forming the dual-cured sealant wherein the method includes the steps of providing the polysulfide, the alkylborane amine catalyst, and the metal oxide catalyst and combining the polysulfide, the alkylborane amine catalyst, and the metal oxide catalyst such that the polysulfide polymerizes in the presence of the metal oxide catalyst and the alkylborane amine catalyst to form the dual-cured sealant. Even further, this disclosure provides a method of forming the article wherein the method includes the steps of providing the polysulfide, the alkylborane amine catalyst, and the metal oxide catalyst and applying the polysulfide, the alkylborane amine catalyst, and the metal oxide catalyst onto the substrate such that the polysulfide polymerizes in the presence of the metal oxide catalyst and the alkylborane amine catalyst and forms the cured sealant disposed on the substrate.

DETAILED DESCRIPTION OF THE DISCLOSURE

This disclosure provides a dual-curable sealant composition (hereinafter described as the "composition."). The composition is curable and may be cured. After cure, the composition may be described as a cured sealant composition or simply as the cured composition. This disclosure describes an uncured composition, a partially cured composition, and a completely or fully cured composition. Accordingly, below, the terminology "composition" may describe any of the aforementioned types of compositions unless otherwise particularly stated.

The composition is not particularly limited and may be used in any industry, for example, in aeronautics, construction, for constructing and/or maintaining aircraft or spacecraft, in motor vehicles, in rail vehicles, in ships, in machines, in appliances and furniture, and, more particularly, for adhesive bonding and/or protection against corrosion of aircraft or spacecraft, motor vehicles, rail vehicles, ships, machines, appliances and furniture. In one embodiment, the composition is used as a sealant in an aircraft. In another embodiment, the composition is used as a sealant on a fuel-tank of an aircraft. In still another embodiment, the composition is used as a sealant on a fuel-tank of a vehicle such as a train, automobile, etc.

The composition includes a polysulfide having an —SH group, a metal oxide catalyst, and an alkylborane amine catalyst. Each of these is described in detail below.

Polysulfide:

The composition includes a polysulfide but may include two or more polysulfides or combinations of polysulfides, any one or more of which may be described below. For example, the composition may include at least one polysulfide, at least two polysulfides, etc. In various non-limiting embodiments described herein, the terminology "polysulfide" may include two or more polysulfides. The terminology "polysulfide" typically describes (one or more) polysulfide (homo)polymer(s). However, it is contemplated that (one or more) polysulfide (co)polymer(s) may also be used, either alone or in combination with the (one or more) (homo)polymers.

The polysulfide has an —SH group but otherwise is not particularly limited and may be any in the art. For example, the polysulfide may have a single —SH group or two or more —SH groups. One or more or all of the groups may be terminal or pendant. In various embodiments, the polysulfide is described as part of a class of chemical compounds including chains of sulfur atoms. In another embodiment, the polysulfide is a polymer having at least one S—S bond in its chain and an —SH group. The polysulfide of this disclosure is typically described as an organic polysulfide (as opposed to a sulfide anion ($S_a^{2-}$)). In one embodiment, the polysulfide of this disclosure has the formula $RS_aR(—SH)_b$, wherein (a) is a number of 2 or greater, each R is independently an alkyl or aryl group, each —SH group is terminal or pendant, and (b) is a number of 1 or greater.

In other embodiments, the polysulfide is further defined as including a plurality of blocks each having the formula wherein x is from 1 to 5 and $R^1$ is an alkyl group having 2 to 16 carbon atoms or an alkyl group 16 carbon atoms that further comprises one or more ether groups, and further having a terminal thiol group having the formula —$R^2$—SH, wherein $R^2$ is an alkyl group having 2 to 16 carbon atoms or an alkyl group having 2 to 16 carbon atoms that further comprises an ether-bond.

In still other embodiments, the polysulfide has the formula —$R^3$—[—S—$(CH_2)_2$—O—[—$R^4$—O-$]_m$—$(CH_2)_2$—S—$R^3$-$]_n$—. In this formula, each $R^3$ is independently a $C_2$-$C_6$ n-alkylene group, a $C_3$-$C_6$ branched alkylene group, a $C_6$-$C_8$ cycloalkylene group, a $C_6$-$C_{10}$ alkylcycloalkylene group, or —[(—$CH_2$—$)_p$—X—$]_q$+$CH_2$—$)_r$, or —[(—$CH_2$—$)_p$—X—$]_q$+$CH_2$—$)_r$, in which at least one $CH_2$ unit is substitute with a methyl group. Moreover, m is a number from 0 to 10, e.g. 1, 2, 3, 4, 5, 6, 7, 8, 9, or 10, n is a number from 1 to 60, e.g. 5 to 55, 10 to 50, 15 to 45, 20 to 40, 25 to 35; p is a number from 2 to 6, e.g. 2, 3, 4, 5, or 6; q is a number from 1 to 5, e.g. 1, 2, 3, 4, or 5, and r is a number from 2 to 10. e.g. 2, 3, 4, 5, 6, 7, 8, 9, or 10. In various non-limiting embodiments, all values and ranges of values between the aforementioned values are hereby expressly contemplated.

In further embodiments, the polysulfide has the formula:

HS—$(C_2H_4$—O—$CH_2$—O—$C_2H_4$—(S—S$)_{2-8})_x$—$C_2H_4$—O—$CH_2$—O—$C_2H_4$—SH wherein x is from 1 to 200, e.g. 5 to 195, 10 to 190, 15 to 185, 20 to 180, 25 to 175, 30 to 170, 35 to 165, 40 to 160, 45 to 155, 50 to 150, 55 to 145, 60 to 140, 65 to 135, 70 to 130, 75 to 125, 80 to 120, 85 to 115, 90 to 110, 95 to 105, or 95 to 100. In various non-limiting embodiments, all values and ranges of values between the aforementioned values are hereby expressly contemplated.

In further embodiments, the polysulfide has the formula:

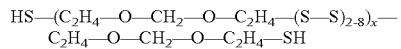

wherein z is from 7 to 43, e.g. 10 to 40, 15 to 35, 20 to 30, or 20 to 25.

In further embodiments, the polysulfide has the formula: HS—(R—SS$)_t$—R—SH, wherein each R is independently a $C_2$-$C_6$ n-alkylene group, a $C_3$-$C_6$ branched alkylene group, a $C_6$-$C_8$ cycloalkylene group, or a $C_6$-$C_{10}$ alkylcycloalkylene group and wherein t is from 5 to 40, e.g. 10 to 35, 15 to 30, 20 to 30, or 25 to 30. In various non-limiting embodiments, all values and ranges of values between the aforementioned values are hereby expressly contemplated.

In further embodiments, the polysulfide has the formula: HS—(R—SS$)_q$—$CH_2CH((SS$—R$)_v$—SH)—$CH_2$—(SS—R$)_r$—SH, wherein each R is independently a $C_2$-$C_6$ n-alkylene group, a $C_3$-$C_6$ branched alkylene group, a $C_6$-$C_8$ cycloalkylene group, or a $C_6$-$C_{10}$ alkylcycloalkylene group, wherein q+v+r is from 5 to 40, e.g. 10 to 35, 15 to 30, 20 to 30, or 25 to 30. In various non-limiting embodiments, all values and ranges of values between the aforementioned values are hereby expressly contemplated.

In further embodiments, the polysulfide has the formula:

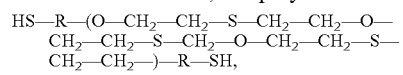

wherein each R is independently as described above.

In still other embodiment the polysulfide may be described as a long-chain polymer with a weight average molecular weight of 2800 to 9000 g/mol, e.g. those of Thioplast G131 or with a weight average molecular weight of 3300 to 5000 g/mol such as Thioplast G10, Thioplast G12, Thioplast G1, Thiokol LP 32, and/or Thiokol LP 12. In various non-limiting embodiments, all values and ranges of values between the aforementioned values are hereby expressly contemplated.

Alternatively, the polysulfide may be described as a short-chain polymer with a weight average molecular weight of 100 to 3200 g/mol, e.g. from 400 to 2800 g/mol and/or from 500 to 1200 g/mol, such as, for example, Thiokol LP3, Thioplast G4, Thioplast G22 or Thioplast G44.

In other embodiments, both long-chain polymers with a weight average molecular weight of 2800 to 9000 g/mol or 3300 to 5000 g/mol and short-chain polymers with a weight average molecular weight of 400 to 2800 g/mol or from 500 to 1200 g/mol, are used, e.g. in a weight ratio of 25:1 to 0.5:1, from 10:1 to 1:1 or from 6:1 to 2:1. In various non-limiting embodiments, all values and ranges of values between the aforementioned values are hereby expressly contemplated.

In still other embodiments, the polysulfide is described as a liquid polymer having a weight average molecular weight of from 100 to 7500 g/mol or from 500 to 6000 g/mol or from 1000 to 3000 g/mol. Alternatively, the polysulfide may have a weight average molecular weight of from 1,000 to 7,500, from 1,500 to 6,000, from 2,000 to 5,500, from 2,500 to 5,000, from 3,000 to 4,500, or from 3,500 to 4,000, g/mol. In various non-limiting embodiments, all values and ranges of values between the aforementioned values are hereby expressly contemplated.

In further embodiments, the polysulfide has a total sulfur content of from 1 to 50 wt %, 2 to 45 wt % or 10 to 38 wt %. In other embodiments, the polysulfide has an average functionality of —SH groups of greater than 2, greater than or equal to 2, 2, less than 2, or less than or equal to 2, e.g. from 1.5 to 2.5 or 1.9 to 2.2. In various embodiments, the average functionality is from 1.5 to 2 or 0.8 to 1.5. In other embodiments, the polysulfide has an average glass transition temperature Tg of from −80 to −30° C. or −60 to −40° C., measured according to AITM 1-0003 Airbus Industry Test Method of June 1995. In various non-limiting embodiments, all values and ranges of values between the aforementioned values are hereby expressly contemplated.

The amount of the polysulfide in the composition is not particularly limited. In various embodiments, the polysulfide is present in the composition in an amount of from 1 to 80, from 1 to 30, from 5 to 30, from 5 to 80, or from 30 to 80, parts by weight per 100 parts by weight of the composition. In various non-limiting embodiments, all values and ranges of values between the aforementioned values are hereby expressly contemplated.

Metal Oxide Catalyst

The composition also includes the metal oxide catalyst. The metal oxide catalyst may be treated (e.g. with sodium hydroxide) or untreated. The metal oxide catalyst may be chosen from manganese dioxide ($MnO_2$), lead dioxide ($PbO_2$), lead oxide (PbO), cadmium oxide (CdO), zinc oxide (ZnO), and combinations thereof. In still other embodiments, the metal catalyst may be chosen from dioxides of lead, manganese, calcium, barium, sodium and zinc, and combinations thereof. In one embodiment, the metal oxide catalyst is manganese dioxide, also known as Manganese (IV) oxide. Other manganese oxides can also be used such as Manganese (II), Manganese (III), Manganese (V), and Manganese (VII), oxides, or combinations thereof. In a further embodiment, a combination of BaO and CaO are used. PbO may also be optionally used.

The amount of the metal oxide catalyst in the composition is not particularly limited. In various embodiments, the metal oxide catalyst is present in the composition in an amount of from 1 to 30, from 1 to 20, or from 1 to 10, parts by weight per 100 parts by weight of the composition. In various non-limiting embodiments, all values and ranges of values between the aforementioned values are hereby expressly contemplated.

Alkylborane Amine Catalyst:

The composition also includes the alkylborane amine catalyst. The alkylborane amine catalyst is typically described as a complex of an alkylborane compound and an amine compound. Said differently, a typical alkylborane amine catalyst includes a complex formed between an alkylborane and a suitable amine compound that renders the complex stable at ambient conditions (e.g. in air). The air-stable complex of the alkylborane amine catalyst may function as a catalyst through decomplexation of the alkylborane compound from the amine compound.

Any alkylborane amine catalyst known in the art may be used. Typically, the alkylborane amine catalyst is capable of curing the polysulfide through introduction of an amine-reactive compound and/or by heating. That is, the alkylborane amine catalyst may be destabilized at ambient temperatures through exposure to suitable amine-reactive compounds. Heat may be applied if needed or desired. The alkylborane amine catalyst may have the formula:

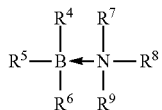

wherein B represents boron. Additionally, each of $R^4$, $R^5$, $R^6$ $R^7$, $R^8$, and $R^9$ is typically independently selected from the group of a hydrogen atom, a cycloalkyl group, a linear or branched alkyl group having from 1 to 12 carbon atoms in a backbone, an alkylaryl group, an organosilane group, an organosiloxane group, an alkylene group capable of functioning as a covalent bridge to the boron, a divalent organosiloxane group capable of functioning as a covalent bridge to the boron, and halogen substituted homologues thereof. Further, each of $R^7$, $R^8$, and $R^9$ typically yields an amine compound or a polyamine compound capable of complexing the boron. In various non-limiting embodiments, two or more of $R^4$, $R^5$, and $R^6$ and two or more of $R^7$, $R^8$, and $R^9$ can combine to form heterocyclic structures, e.g. provided a sum of the number of atoms from $R^4$, $R^5$, $R^6$, $R^7$, $R^8$, and $R^9$ does not exceed 11.

In various embodiments, the alkylborane compound of the alkylborane amine catalyst includes a tri-functional borane which has the general structure:

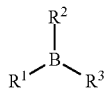

wherein each of $R^1$-$R^3$ independently has from 1 to 20 carbon atoms and wherein each of $R^1$-$R^3$ independently comprise one of an aliphatic hydrocarbon group or an aromatic hydrocarbon group. The aliphatic and/or aromatic hydrocarbon groups may be linear, branched, and/or cyclic. Suitable examples of the alkylborane include, but are not limited to, tri-methylborane, triethylborane, diethyl borane, tri-n-butylborane, tri-n-octylborane, tri-sec-butylborane, tri-dodecylborane, phenyldiethylborane, and combinations thereof. In one embodiment, the alkylborane compound includes tri-n-butylborane. In various non-limiting embodiments, all values and ranges of values between the aforementioned values are hereby expressly contemplated.

Additionally, any amine known in the art may, in theory, be used to form the alkylborane amine catalyst. Typically, the amine includes at least one of an alkyl group, an alkoxy group, an alkylamino group, an imidazole group, an amidine group, an ureido group, and combinations thereof. Particularly suitable amines include, but are not limited to, 1,3-propane diamine, 1,6-hexanediamine, methoxypropylamine, pyridine, isophorone diamine, and combinations thereof.

In various embodiments, the alkylborane amine catalyst has one or more alkyl groups bonded to a boron atom and each of the one of more alkyl groups is independently further defined as a $C_1$-$C_{12}$ alkyl group, e.g. an alkyl group having 1, 2, 3, 4, 5, 6, 7, 8, 9, 10, 11, or 12, carbon atoms. The alkyl group may be linear, branched, cyclic, etc. and may be any known in the art having 1 to 12 carbon atoms. In other embodiments, the alkylborane amine catalyst has one more alkyl groups bonded to a nitrogen atom and each of the one of more alkyl groups is independently further defined as a $C_1$-$C_{12}$ alkyl group. Just as above, the alkyl group may have 1, 2, 3, 4, 5, 6, 7, 8, 9, 10, 11, or 12, carbon atoms and may be linear, branched, cyclic, etc. and may be any known in the art having 1 to 12 carbon atoms. The groups bonded to the boron atom may be the same or different than the groups bonded to the nitrogen atom. In various non-limiting embodiments, all values and ranges of values between the aforementioned values are hereby expressly contemplated.

The alkylborane amine catalyst may be used in any amount. Typically, the alkylborane amine catalyst is used in an amount equivalent to of from 0.1 to 10, 0.5 to 9, 1 to 7, 0.1 to 5, 1.5 to 5, 2 to 4, 0.5 to 4.5, 1 to 4, 1.5 to 3.5, 2 to 3, or 2.5 to 3, parts by weight per 100 parts by weight of the composition. In other embodiments, the alkylborane amine catalyst is used in an amount equivalent to of from 0.1 to 10, from 0.1 to 8, from 1 to 10, from 2 to 9, from 3 to 8, from 4 to 7, or from 5 to 6, parts by weight per 100 parts by weight of the composition.

The amounts of the alkylborane amine catalyst typically depend upon a molecular weight and functionality of the polysulfide and the presence of other components such as fillers. In various embodiments, the amount used is based on percent boron in the reaction mixture, calculated by the weight of the active ingredients (e.g. polysulfide(s)). In various non-limiting embodiments, all values and ranges of values between the aforementioned values are hereby expressly contemplated.

Reactive Compound/Decomplexer:

In addition, a reactive compound (e.g. an amine reactive compound), such as a decomplexer, may also be utilized or may be omitted. For example, the alkylborane amine catalyst may interact with an amine-reactive compound to initiate or accelerate curing of the polysulfide. This may allow the polysulfide to cure at lower temperatures and/or with increased reaction rate and decreased cure times. Typically this occurs when the amine-reactive compound is mixed with the alkylborane amine catalyst and may be exposed to an oxygenated environment at temperatures below a dissociation temperature of the alkylborane amine catalyst, including room temperature and below. In terms of "activating" the alkylborane, oxygen is not necessarily required. However, an oxygen source is typically later required to create reactive radicals. It is contemplated that an excess of oxygen may quench the alkylborane to give unreactive products. Referring back, the amine-reactive compound may be or include any amine-reactive compound known in the art and can be delivered as a gas, liquid, or solid. In one embodiment, the amine-reactive compound includes free radical polymerizable groups or other functional groups such as a hydrolyzable group, and can be monomeric, dimeric, oligomeric or polymeric. In various embodiments, the alkylborane amine catalyst includes a trialkylborane amine catalyst. In other embodiments, the amine-reactive compound is chosen from acids, anhydrides, and combinations thereof.

In various embodiments, the amine-reactive compound is chosen from the group of an acid, an anhydride, and combinations thereof. In other embodiment, the amine-reactive compound includes amine-reactive groups, such as amine-reactive groups. It is contemplated that the amine-reactive groups may be derived from the alkylborane amine catalyst and/or any additives present. The amine-reactive compound may be selected from the group of Lewis acids, carboxylic acids, carboxylic acid derivatives, carboxylic acid salts, isocyanates, aldehydes, esters, epoxides, acid chlorides, sulphonyl chlorides, iodonium salts, anhydrides, and combinations thereof. In one embodiment, the amine-reactive compound is selected from the group of isophorone diisocyanate, hexamethylenediisocyanate, toluenediisocyanate, methyldiphenyldiisocyanate, acrylic acid, methacrylic acid, 2-hydroxyethylacrylate, 2-hydroxymethylacrylate, 2-hydroxypropylacrylate, 2-hydroxypropylmethacrylate, methacrylic anhydride, undecylenic acid, citraconic anhydride, polyacrylic acid, polymethacrylic acid, and combinations thereof. In yet another embodiment, the amine-reactive compound is selected from the group of oleic acid, undecylenic acid, polymethacrylic acid, acrylic acid, stearic acid, citric acid, levulinic acid, and 2-carboxyethyl acrylate, and combinations thereof. In another embodiment, the amine-reactive compound may include, but is not limited to, acetic acid, acrylic acid, methacrylic acid, methacrylic anhydride, undecylenic acid, oleic acid, an isophorone diisocyanate monomer or oligomer, a hexamethylenediisocyanate monomer, oligomer, or polymer, a toluenediisocyanate monomer, oligomer, or polymer, a methyldiphenyldiisocyanate monomer, oligomer, or polymer, methacryloylisocyanate, 2-(methacryloyloxy)ethyl acetoacetate, undecylenic aldehyde, dodecyl succinic anhydride, compounds capable of generating amine-reactive groups when exposed to ultraviolet radiation such as photoacid generators and iodonium salts including [SbF6]-counter ions. With such ultraviolet photoacid generators, a photosensitizing compound such as isopropylthioxanthone may be included.

The decomplexer/amine-reactive compound may be used in an amount of 0.1 to 5, 0.5 to 4.5, 1 to 4, 1.5 to 3.5, 2 to 3, 2.5 to 3, from 0.1 to 10, from 0.1 to 8, from 1 to 10, from 2 to 9, from 3 to 8, from 4 to 7, or from 5 to 6, parts by weight per 100 parts by weight of the composition. In various non-limiting embodiments, all values and ranges of values between the aforementioned values are hereby expressly contemplated. The amount of the amine-reactive compound may depend upon a molecular weight and functionality of the amine-reactive compound and the presence of other components such as fillers. In another embodiment, the amine-reactive compound is typically used in an amount wherein a molar ratio of amine-reactive groups to nitrogen groups in the alkylborane amine catalyst is of from 0.1:100, more typically from 0.5:50, and most typically from 0.8:20. In various non-limiting embodiments, all values and ranges of values between the aforementioned values are hereby expressly contemplated.

In various embodiments, the composition and/or sealant (during or after curing) includes a weight percent of boron that is approximately equimolar to an amount of boron initially present in the curable sealant composition within 10 mol %, e.g. ±1, 2, 3, 4, 5, 6, 7, 8, 9, or 10, mol %. For example, the amount of boron present in the composition and/or sealant either during or after cure is typically the same as the amount of boron initially added to the composition as part of the alkylborane amine catalyst. This amount is typically measured or reported as mole percent for the sake of accuracy. The amount of boron present during or after cure is typically within 10 mol percent of the amount of boron added at the beginning, e.g. the amount of boron added as part of the alkylborane amine catalyst. In various non-limiting embodiments, all values and ranges of values between the aforementioned values are hereby expressly contemplated.

Cure Accelerator:

The composition may also include, or be free of, a cure accelerator. The cure accelerator may be any known in the art. For example, the cure accelerator may be a basic amine. In other embodiments, the cure accelerator is an aminic curing accelerator. In still other embodiments, the cure accelerator is chosen from tertiary amines, such as 1,4-diazabicyclo[2,2,2]octane (DABCO or TEDA), 1,8-diazabicyclo[5,4,0]undec-7-ene (DBU), 1,5-diazabicyclo[4,3,0]non-5-ene (DBN), N,N,N',N",N"-pentamethyldiethylenetriamine (PMDETA), N-methyl-N'-(dimethylaminoethyl)piperazine, N,N-dimethylcyclohexylamine (DMCHA), N,N',N"-tris(dimethylaminopropyl)hexahydrotriazine or bis(2-(dimethylamino)ethyl)ether (BDMAEE), guanidine and derivatives thereof, such as diphenylguanidine, tetramethylguanidine or di-o-tolylguanidine, morpholine and derivatives thereof, such as N-methylmorpholine (NMM), N-ethylmorpholine (NEM), dimorpholinodiethyl ether (DMDEE), or N-methylmorpholine oxide (NMMO), Lewis acids, such as $FeCl_3$, $AlCl_3$ or $SnCl_2$, and tin salts, such as dibutyl tin dilaurate (DBTDL) or dioctyl tin dilaurate (DOTDL), and combinations thereof. In other embodiments, the cure accelerator may be chosen from guanidines, bis(piperidinothiocarbonyl) tetrasulphide, and strong N bases (as would be understood in the art), and combinations thereof. In still further embodiments, the cure accelerator may be chosen from tertiary amines, and more particularly 1,4-diazabicyclo[2,2,2]octane (DABCO or TEDA) and 1,8-diazabicyclo[5,4,0]undec-7-ene (DBU), and combinations thereof.

In further embodiments, the cure accelerator is an amine or thiuram curing accelerator. In various embodiments, the thiuram curing accelerator has the structure:

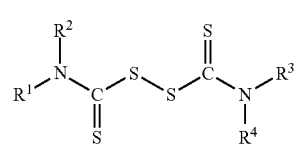

wherein each of $R^1$, $R^2$, $R^3$, and $R^4$, is any alkyl group having 1 to 20 carbon atoms, e.g. any described in this disclosure. In other embodiments, the thiuram curing accelerator has the structure:

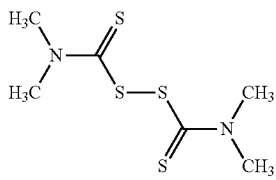

The amount of the cure accelerator that may be used is not particularly limited and may be chosen by one of skill in the art. In various embodiments, the cure accelerator is present in an amount of from 0.1 to 10, from 0.5 to 10, from 1 to 10, from 0.1 to 1, from 0.5 to 1, from 1 to 5, or from 5 to 10, parts by weight per 100 parts of polysulfide. In various non-limiting embodiments, all values and ranges of values between the aforementioned values are hereby expressly contemplated.

Additives:

The composition may also include one or more additives or be free of any one or more additives, such as those described below. For example, in various embodiments, the composition includes a plasticizer such as, but not limited to, aliphatic oils, waxes, fatty acid salts, resins derived from alkylated phenols and esters, and combinations thereof. In other embodiments, the composition includes one or more fillers such as, but not limited to, microspheres, polystyrene foam, polyacrylates, polyolefins, silica, aluminum/silica, aluminum silicate, calcium carbonate, coated polyvinylidene, calcium silicates, fumed silica, precipitated silica, polyethylene, Calcium carbonate, carbon black, calcined clay, talc, silica, silicate fillers, rutile titanium dioxide, zeolites, and combinations thereof. In still other embodiments, the composition includes one or more adhesion promoters such as, but not limited to, methylon AP-108, Duerz 16674, Bakelite BRL 3741, Resinex 468, silanes, phenolic resins, polysulfides, epoxy functional molecules, and combinations thereof. In further embodiments, the composition includes surfactants, such as those known in the art, thixotropic agents such as sepiolite and those known in the art, solvents such as organic solvents, ethyl acetate, terphenyls, hydrogenated terphenyls, toluene, and those known in the art, and/or pigments such as titanium dioxide, zinc sulfide, carbon black, organic and inorganic pigments, and those known in the art, and combinations thereof. In further embodiments, the composition includes photosensitizers and/or photo initiators, or combinations thereof. Moreover, the composition may be free of any one or more such additives.

In still other embodiments, the composition may include or be free of one or more of calcium carbonate, butanone, toluene, titanium dioxide, Ethanethiol, 2,2-thiobis-1 reaction products with reduced 1,1'-[methylenebis(oxy)]bis [2-chloroethane]-sodium sulfide (Na2 (Sx)-1,2,3-trichloropropane polymer, ethyl acetate, hydrogenated Terphenyls, Zeolites, quarter- and higher, partially hydrogenated Polyphenyls, Talc, carbon black, magnesium carbonate, 1,3-diphenylguanidine, bis(piperidinothiocarbonyl) tetrasulphide, photoinitiators, photosensitizers such as benzophenone, isopropyl thioxanthone, aluminum silicate, phenolic resins, Sepiolite, NaAl-based zeolite, phosphorous acid esters, monomeric isocyanates, e.g. based on MDI, pyrogenic silica, and/or combinations thereof.

In still further embodiments, mixtures of photosensitizers and/or photoinitiators may be used to adjust the absorption wavelength(s) of the composition or to shift the absorption edge and/or the absorption range of the composition. Further, fillers based on magnesium silicate hydrate such as, for example, talc, based on aluminum hydroxide such as, for example, $Al(OH)_3$, based on a feldspar, based on quartz powder and/or based on a calcium silicate and/or aluminum silicate may be used and may have a particle size from 1 to 20 micrometers. Adding one or more fillers may serve to improve the mechanical properties of the composition. In various embodiments, the fillers are chosen from calcium silicate, magnesium silicate hydrate, aluminum silicate, quartz powder and/or aluminum hydroxide such as, for example, aluminum trihydrate. Fillers based on $CaCO_3$, $TiO_2$, carbon black and/or $BaSO_4$ as well as fillers with a significant Fe content and/or containing additional heavy metals may be used.

Lightweight fillers, in particular those based on polyurethane including their copolymers, polyamide wax and/or polyolefin wax may also be used. Lightweight fillers may also be used to reduce the density of the composition and/or sealant. Alternatively or additionally, hollow filing bodies may also be used.

Thixotropy agents, in particular based on feldspar, silicic acid/silica, sepiolite and/or bentonite may be used to adjust rheological properties, in particular for thixotropic behavior, of the composition.

Plasticizers, in particular based on an adipate, a benzoate, a citrate, a phthalate, an ester of a polyethylene glycol, and/or a terphenyl may be used, for example, to increase the flexibility of the composition and/or sealant.

Adhesion promoters, in particular those based on a phenolic resin, a resol and/or a silane/silanol/siloxane, e.g. mercaptopropyltrimethoxysilane, mercaptopropyltriethoxysilane, glycidoxypropyltrimethoxysilane, glycidoxypropyltriethoxysilane, methacryloxymethyltrimethoxysilane and/or (methacryloxymethyl)methyldimethoxysilane and/or a bis-silylsilane may be used to improve the adhesion of the composition and/or sealant to a substrate.

Anti-aging agents may also be used such as sterically hindered phenols, phenyleneamine and/or hindered amine light stabilizers such as 4,6-bis(dodecylthiomethyl)-o-cresol, ethylene-bis(oxyethylene)bis(3-(5-tert-butyl-4-hydroxy-m-tolyl)propionate-, thiodiethylene-bis[3-(3,5-di-tert-butyl-4-hydroxyphenyl)propionate], pentaerythritol tetrakis(3-(3,5-di-tert-butyl-4-hydroxyphenyl)-propionate) and/or phenylene amines such as, for example, N-isopropyl-N'-phenyl-p-phenylenediamine. Anti-aging agents may be used to scavenge the free radicals formed due to aging processes involving the composition and may contribute to delaying and/or preventing aging such as yellowing or embrittlement of the composition and/or sealant.

Water scavengers, e.g. those based on an organofunctional alkoxysilane, based on a zeolite such as an alkali aluminum zeolite and/or based on a monofunctional isocyanate may also be used.

Flame retardants, in particular those based on phosphate esters, based on ammonium polyphosphate, based on melamine, based on aluminum hydroxide and/or based on magnesium hydroxide may also be used to improve the fire prevention behavior of the composition and/or sealant such as, for example, to delay the onset of burning of the sealant, to spontaneously terminate the burning process and/or to reduce the formation of smoke.

Vulcanization promoters may also be used such as diphenylguanidine, thiuram, and/or sulfur (e.g. sulfur paste).

In various embodiments, at least one organic solvent, in particular based on an ester and/or an ether such as, for example, ethyl acetate and/or monopropylene glycol monomethyl ether can be used.

The one or more additives may be present in an amount of from 0 to 20, 0.1 to 10, from 0.1 to 5, or from 0.1 to 2, parts by weight per 100 parts by weight of the composition. In various non-limiting embodiments, all values and ranges of values between the aforementioned values are hereby expressly contemplated.

In still other embodiments, the composition includes an acid or is free of an acid. If included, the acid is typically acetic acid, acrylic acid, isostearine acid, and combinations thereof. Also, if included, the acid is included in an amount of from 0.1 to 3, from 0.1 to 2, from 0.1 to 1, or from 0.25 to 0.75, parts by weight per 100 parts by weight of the composition. In various non-limiting embodiments, all values and ranges of values between the aforementioned values are hereby expressly contemplated.

Dual-Cure Sealant System:

This disclosure also provides a dual-cure sealant system. In one embodiment, this system includes a first component including, consisting essentially of, or consisting of, the polysulfide and the alkylborane amine catalyst, and a second component including, consisting essentially of, or consisting of, the metal oxide catalyst. In another embodiment, this system includes a first component including, consisting essentially of, or consisting of, the polysulfide and a first portion of the alkylborane amine catalyst, and a second component including, consisting essentially of, or consisting of, the metal oxide catalyst and a second portion of the alkylborane amine catalyst. In still other embodiments, the system includes a first component including, consisting essentially of, or consisting of, the polysulfide and a second component including, consisting essentially of, or consisting of, the metal oxide catalyst and the alkylborane amine catalyst. Moreover, one or more additives or any other components described above may be present in one or both components. The terminology "consisting essentially of" describes that the first and/or second component is free of other polymers, monomers, catalysts, etc. In various embodiments, the first component and the second component are utilized in an amount of 1:1, 2:1, 3:1, 4:1, 5:1, 6:1, 7:1, 8:1, 9:1, or 10:1, or vice versa. In various non-limiting embodiments, all values and ranges of values between the aforementioned values are hereby expressly contemplated.

Sealant:

The disclosure also provides a sealant, which may be described as the result of the composition after cure. Alternatively, the sealant may be described as a partially cured composition.

The composition cures typically using the dual-cure mechanism based on the metal oxide catalyst and the alkylborane amine catalyst to form the sealant. Each of these mechanisms is generally known in the art. The sealant may be described as the polymerization product of the polysulfide reacted in the presence of the metal oxide catalyst and the organoborane amine catalyst. Alternatively, the sealant may include, consist essentially of, or consist of, such a polymerization product. The terminology "consist essentially of" describes embodiments that are free of polymers or co-polymers, of any known in the art, that are not the sealant itself, i.e., the polymerization product of the polysulfide reacted in the presence of the metal oxide catalyst and the organoborane amine catalyst.

In various embodiments, the composition cures to have a viscosity of greater than 1,000, 1,500, 2,000, 2,500, or 3,000 cps in 15, 10, or 5 minutes. Typically, a maximum viscosity in 15, 10, or 5 minutes is greater than 1000 cps as measured using a viscometer such as a Brookfield DV-II+Pro with an appropriate spindle such as a # RV7 spindle. The maximum viscosities in these times may be 10,000, 50,000, 100,000, 500,000, 1,000,000, 1,500,000, etc. up to about 350,000,000, cps, measured in the same way. In various non-limiting embodiments, all values and ranges of values between the aforementioned values are hereby expressly contemplated.

In various embodiments, the composition cures to a tack-free time of from 0.05 to 5 minutes after the start of cure according to DIN 65262-1. In other embodiments, the composition cures to a tack-free time of less than 120, 115, 110, 105, 100, 96, 90, 85, 80, 75, 70, 65, 60, 55, 50, 45, 40, 35, 30, 25, 20, 15, 10, or 5, minutes, after the start of cure according to DIN 65262-1. In other embodiments, the sealant has a complete curing time or the time until reaching a Shore hardness of 30, determined according to ISO 7619 or ASTM D2240, from 1 to 960 min, of from 5 to 300 min, of from 10 to 60 min. In additional embodiments, one or more portions of the sealant composition, e.g. the first and second components, may have a density, determined according to ISO 2781, of from 0.9 to 1.6 g/cm$^3$ or from 1.2 to 1.5 g/cm$^3$. In various non-limiting embodiments, all values and ranges of values between the aforementioned values are hereby expressly contemplated.

In other embodiments, the sealant has a Shore A hardness, determined according to ISO 7619 and measured 2 weeks after cure in storage in air at 23° C. and 50% relative atmospheric humidity, of from 20 to 80, of from 30 to 60, or of from 40 to 55. In additional embodiments, the sealant has a Shore A hardness of at least 10 within 30 to 180 minutes of curing. In further embodiments, the sealant has an elongation at break, determined according to ISO 37 and measured 2 weeks after cure during storage in air at 23° C. and 50% relative atmospheric humidity, of from 100 to 1000%, of from 200% to 800% or from 300% to 600%. In various non-limiting embodiments, all values and ranges of values between the aforementioned values are hereby expressly contemplated.

In other embodiments, the sealant has an elongation, determined according to ISO 37 and measured after 168 hours in storage in a fuel at 60° C., using the jet AI type of fuel, is of from 100 to 800%, of from 200 to 600% or of from 300 to 500%. In other embodiments, the sealant has an elongation at break of the sealants according to the invention, determined according to ISO 37 and measured after 300 hours in storage in fuel at 100° C., using the jet AI type of fuel is preferably of from 100 to 700%, especially preferably of from 200 to 600% or 400 to 500%. In even further embodiments, the sealant has an elongation at break, determined according to ISO 37 and measured after 1000 hours in storage in water at 35° C., of from 100 to 700%, e.g. from 200 to 500% or 250 to 350%. In various non-limiting embodiments, all values and ranges of values between the aforementioned values are hereby expressly contemplated.

In other embodiments, the sealant has a peel resistance on aluminum alloy 2024 T3, determined according to DIN 65262-1, of from 60 to 350 N/25 mm, e.g. from 100 to 250 N/25 mm or 160 to 200 N/25 mm. Alternatively, the sealant has a peel resistance on enamels, such as, for example, on base enamels including solvent such as, for example, epoxy base enamel 37035 A from Akzo Nobel Aerospace Coatings, on water-based base enamels such as, for example, those based on epoxy such as Seevenax 313-01 and Seevenax 313-02 from Mankiewicz, on cover enamels such as, for example, water-based top coats based on epoxies such as Seevenax 313-01 from Mankiewicz, on finish F 70-A from Mapaero and/or on solvent-containing top coats based on polyurethanes such as Aerodur 21-100 from Akzo Nobel and Alexit 406-22 from Mankiewicz, determined according to DIN 65262-1, of from 50 to 350 N/25 mm, e.g. from 10 to 300 N/25 mm or from 170 to 210 N/25 mm. In various embodiments, the peel resistance is determined on substrates of aluminum or aluminum alloys, of titanium or titanium alloys, of stainless steels, of composite materials such as, for example, carbon fiber-reinforced plastic CFP and/or on enamel substrates that have been enameled, for example, with at least one solvent-containing or water-based base coat and/or top coat, in particular based on epoxy, polyester or polyurethane enamel. In various non-limiting embodiments, all values and ranges of values between the aforementioned values are hereby expressly contemplated.

In additional embodiments, the sealant has a tensile strength, determined according to ISO 37 and measured after 2 weeks after UV irradiation with storage in air at 23° C. and 50% relative atmospheric humidity, of from 0.5 to 3.5 MPa, e.g. from 1 to 3 MPa or 1.8 to 2.7 MPa. In other embodiments, the sealant has a tensile strength, determined according to ISO 37 and measured after 168 hours at 60° C. in storage in fuel of jet Al type, is of from 0.5 to 3 MPa, e.g. of from 1 to 2.5 or 1.5 to 2 MPa. In further embodiments, the sealant has a tensile strength, determined according to ISO 37 and measured after 300 hours at 100° C. in storage in fuel of jet Al type, of from 0.5 to 3 MPa, e.g. from 1 to 2 or 0.8 to 1.1 MPa. In further embodiments, the sealant has a tensile strength, determined according to ISO 37 and measured after 1000 hours at 35° C. in storage in water, of from 0.5 to 3 MPa, e.g. of from 1 to 2 MPa or 1.5 to 1.7 MPa. In various non-limiting embodiments, all values and ranges of values between the aforementioned values are hereby expressly contemplated.

In still other embodiments, the sealant exhibits no cracks or other defects that occur in determination of low temperature flexibility due to bending at an angle of 30 degrees at a temperature of −55° C., a tensile strength of from 0.5 to 2.8 MPa after 168 hours of storage in a fuel at a temperature of 60° C., after 300 hours of storage in a fuel at a temperature of 100° C., and after 1000 hours of storage in water at a temperature of 35° C., an elongation at break of from 100 to 800% after 168 hours of storage in fuel at a temperature of 60° C., after 300 hours of storage in a fuel at a temperature of 100° C., and after 1000 hours of storage in water at a temperature of 35° C. and/or a density of from 1.00 to 1.45 g/cm$^3$. In still other embodiments, the sealant as the following properties after complete curing: a tensile strength of from 0.5 to 3 MPa, an elongation at break of from 100 to 900% and/or a peel resistance of from 50 to 300 N/25 mm. In various non-limiting embodiments, all values and ranges of values between the aforementioned values are hereby expressly contemplated.

Article:

This disclosure also provides an article that includes a substrate and the composition and/or (cured or partially cured) sealant disposed thereon. The article may be one used in the aviation industry, but may also be used wherever a rapid and complete curing and especially a very rapid surface curing with a relatively long sealant processing time are necessary and/or advantageous. For example, the article may be a tank or area to be sealed. In various embodiments, the composition and/or sealant may be used for plastering as in gas stations and chemical installations, for example, for connecting structural elements placed on top of one another such as sheet metal, films and other substrates, for filling cavities and intermediate spaces, for coating metallic materials in particular and composites such as, for example, carbon fiber reinforced or glass fiber reinforced plastics, for aerodynamic smoothing and compaction as well as for preventing corrosion in locations where the anticorrosion layers of the metallic elements have been damaged or removed, for example, in the area of boreholes. A load-bearing function may also be fulfilled, for example, during shipping. In various embodiments, the article is used in the shipping industry such as, for example, in automotive engineering, in the construction of rail vehicles, in shipbuilding, in the airplane construction industry or in the spacecraft construction industry, in machine and equipment construction, in the building industry or for the production of furniture. In one embodiment, the article is an aircraft fuel tank. In another embodiment, the article is further defined as a construction article, aircraft/aerospace article, motor or rail vehicle, ship, machine, glass insulation, and/or furniture. In still another embodiment, the article is further defined as glass insulation.

Methods:

This disclosure also provides a method of forming the dual-curable sealant composition wherein the method includes the steps of providing the polysulfide, the alkylborane amine catalyst, and the metal oxide catalyst, and combining the polysulfide, the alkylborane amine catalyst, and the metal oxide catalyst to form the dual-curable composition.

This disclosure also provides a method of forming the dual-cured sealant including the polymerization product of the polysulfide reacted in the presence of the metal oxide catalyst and the alkylborane amine catalyst. The method includes the steps of providing the polysulfide, the alkylborane amine catalyst, and the metal oxide catalyst; and combining the polysulfide, the alkylborane amine catalyst, and the metal oxide catalyst such that the polysulfide polymerizes in the presence of the metal oxide catalyst and the alkylborane amine catalyst to form the dual-cured sealant.

This disclosure also provides a method of forming an article including the substrate and the dual-cured sealant disposed thereon, wherein the dual-cured sealant includes the reaction product of the polysulfide reacted in the presence of the metal oxide catalyst and the alkylborane amine catalyst. The method includes the steps of providing the polysulfide, the alkylborane amine catalyst, and the metal oxide catalyst; and applying the polysulfide, the alkylborane amine catalyst, and the metal oxide catalyst onto the substrate such that the polysulfide polymerizes in the presence of the metal oxide catalyst and the alkylborane amine catalyst and forms the cured sealant disposed on the substrate.

In the aforementioned methods, each step of providing may be any known in the art. Similarly, any step of combining may be any known in the art such that any one or more of the aforementioned components may be combined in any order and as a whole or in parts. Moreover, the step of applying may be further defined as dipping, pouring, spraying, brushing, or any other method of application known in the art.

Examples

The compositions of Part A set forth in the matrix below are prepared by first mixing polysulfide polymers such as Thiokol LP 12, Thiokol LP2 and others, alkylborane-amine complexes such as triethylborane-1,3-diaminopropane complex (TEB-DAP), tri-n-butylborane-3-methoxy-1-aminopropane complex (TnBB-MOPA), plasticizers such as Benzoflex 88, fillers such as calcium carbonate, kaolin and others.

The compositions of Part B set forth in the matrix below are prepared by mixing manganese oxide with amine accelerators such as thiuram. In various embodiments, the compositions of Part B may be mixed with the compositions of Part A at a ratio of from about 15:1 to about 1:15, or any range of ratios therebetween, including the endpoints. In the examples below, the compositions of Part B are mixed with the compositions of Part A at a 1.2:10 to ratio manually or employing a speed mixer (FlackTek, speed-2500 rpm, time-one minute). The ratio of alkylborane amine complex is varied in the overall mixture.

After mixing Parts A and B, touch tack free time is determined according to ASTM C679. In addition, Shore A Hardness after 24 hours at room temperature is also determined. This data is set forth below. Viscosity measurements are determined using a Brookfield viscometer DV-II+Pro, spindle #7. The viscosity data is set forth in FIG. 1.

|  | Example 1 | Example 2 | Example 3 | Example 4 |
|---|---|---|---|---|
| Part A |  |  |  |  |
| Long chain polysulfide (4000 g/mol) | 55.6 | 55.6 | 55.6 | 55.6 |
| TEB-DAP | 0 | 0.5 | 1.5 | 2.5 |
| Kaolin | 31.8 | 31.8 | 31.8 | 31.8 |
| Benzoflex 88 | 12 | 12 | 12 | 12 |
| Part B |  |  |  |  |
| $MnO_2$ | 58 | 58 | 58 | 58 |
| Benzoflex 88 | 40.1 | 40.1 | 40.1 | 40.1 |
| Thiuram | 0.6 | 0.6 | 0.6 | 0.6 |
| Guanidine | 0.7 | 0.7 | 0.7 | 0.7 |
| $H_2O$ | 0.6 | 0.6 | 0.6 | 0.6 |
| Physical Properties |  |  |  |  |
| Tack Free Time (min) | >1440 | 285 | 105 | 60 |
| Shore A Hardness After 24 h at RT | Not Measureable | 41 | 44 | 41 |

|  | Example 5 | Example 6 | Example 7 | Example 8 |
|---|---|---|---|---|
| Part A |  |  |  |  |
| Long chain polysulfide (4000 g/mol) | 55.5 | 55.5 | 55.5 | 55.5 |
| TEB-DAP | 1.9 | 0.8 | 0.6 | 0 |
| Kaolin | 31.8 | 31.8 | 31.8 | 31.8 |
| Benzoflex 88 | 12 | 12 | 12 | 12 |
| Part B |  |  |  |  |
| $MnO_2$ | 58 | 58 | 58 | 58 |
| Benzoflex 88 | 40.1 | 40.1 | 40.1 | 40.1 |
| Thiuram | 0.6 | 0.6 | 0.6 | 0.6 |
| Guanidine | 0.7 | 0.7 | 0.7 | 0.7 |
| $H_2O$ | 0.6 | 0.6 | 0.6 | 0.6 |

The data shows that as the amount of TEB-DAP in the composition is increased, the amount of time needed for tack free decreases significantly, e.g. >1440 min at 0 parts TEB-DAP to 60 min at 2.5 parts TEB-DAP without affecting the hardness. This increases efficiency and productivity.

In various non-limiting embodiments, the instant disclosure may include or utilize one or more compounds, components, articles, method steps, etc. as described in the PCT application filed concurrently herewith and designated as BASF, which claims priority to U.S. Prov. App. Ser. No. 62/319,574.

All combinations of the aforementioned embodiments throughout the entire disclosure are hereby expressly contemplated in one or more non-limiting embodiments even if such a disclosure is not described verbatim in a single paragraph or section above. In other words, an expressly contemplated embodiment may include any one or more elements described above selected and combined from any portion of the disclosure.

One or more of the values described above may vary by ±5%, ±10%, ±15%, ±20%, ±25%, etc. Unexpected results may be obtained from each member of a Markush group independent from all other members. Each member may be relied upon individually and or in combination and provides adequate support for specific embodiments within the scope of the appended claims. The subject matter of all combinations of independent and dependent claims, both singly and multiply dependent, is herein expressly contemplated. The disclosure is illustrative including words of description rather than of limitation. Many modifications and variations of the present disclosure are possible in light of the above teachings, and the disclosure may be practiced otherwise than as specifically described herein.

It is also to be understood that any ranges and subranges relied upon in describing various embodiments of the present disclosure independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present disclosure, and such ranges and subranges may be further delineated into relevant halves, thirds, quarters, fifths, and so on. As just one example, a range "of from 0.1 to 0.9" may be further delineated into a lower third, i.e. from 0.1 to 0.3, a middle third, i.e. from 0.4 to 0.6, and an upper third, i.e. from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

What is claimed is:

1. A dual-curable sealant composition comprising:
   A. a polysulfide having an —SH group from 30 to 80 parts by weight per 100 parts by weight of the composition;
   B. a metal oxide catalyst from 1 to 10 parts by weight per 100 parts by weight of the composition;
   C. an alkylborane amine catalyst from 0.5 to 4.5 parts by weight per 100 parts by weight of the composition; and D. a thiuram curing accelerator from 0.1 to 10 parts by weight per 100 parts by weight of the composition.

2. The dual-curable sealant composition of claim 1 wherein said alkylborane amine catalyst has one or more alkyl groups bonded to a boron atom and each of said one of more alkyl groups is independently further defined as a $C_1$-$C_{12}$ alkyl group.

3. The dual-curable sealant composition of claim 1 wherein said alkylborane amine catalyst has one more alkyl groups bonded to a nitrogen atom and each of said one of more alkyl groups is independently further defined as a $C_1$-$C_{12}$ alkyl group.

4. The dual-curable sealant composition of claim 1 wherein said polysulfide has an —SH functionality of greater than or equal to 2.

5. The dual-curable sealant composition of claim 1 wherein said polysulfide has a weight average molecular weight of from 1,000 to 7,500 g/mol.

6. The dual-curable sealant composition of claim 1 wherein said metal oxide catalyst is manganese dioxide.

7. The dual-curable sealant composition of claim 1 that cures to have a viscosity of greater than 1,000 cps in 15 minutes.

8. The dual-curable sealant composition of claim 1 that cures to a tack-free of less than 120 minutes after the start of cure according to DIN 65262-1.

9. The dual-curable sealant composition of claim 1 that is free of an acid.

10. The dual-curable sealant composition of claim 1 that further comprises an acid.

11. A cured sealant formed from the dual-curable sealant composition claim 1 and comprising a weight percent of boron that is approximately equimolar to an amount of boron present in the dual-curable sealant composition within 10 mol %.

12. A dual-cured sealant that is the polymerization product of a polysulfide having an —SH group reacted in the presence of a metal oxide catalyst and an alkylborane amine catalyst.

13. The dual-cured sealant of claim 12 comprising a weight percent of boron that is approximately equimolar to an amount of boron present during polymerization ±10%.

14. The dual-cured sealant of claim 12 that has a Shore A hardness of at least 10 within 30 to 180 minutes of curing.

15. A method of forming a dual-curable sealant composition comprising a polysulfide having an —SH group, a metal oxide catalyst, and an alkylborane amine catalyst, said method comprising the steps of:
   providing the polysulfide, the alkylborane amine catalyst, and the metal oxide catalyst; and
   combining the polysulfide, the alkylborane amine catalyst, and the metal oxide catalyst to form the dual-curable composition.

16. An article comprising a substrate and dual-cured sealant disposed thereon, wherein said dual-cured sealant comprises the reaction product of a polysulfide having an —SH group reacted in the presence of a metal oxide catalyst and an alkylborane amine catalyst.

17. The article of claim 16 wherein said dual-cured sealant comprises a weight percent of boron that is approximately equimolar to an amount of boron present during reaction of the polysulfide within 10 mol %.

18. The article of claim 16 that is further defined as an aircraft fuel tank, a construction article, aircraft/aerospace article, motor or rail vehicle, ship, machine, glass insulation, and/or furniture.

19. A method of forming the dual-curable sealant composition according to claim 1, said method comprising the steps of:
   providing the polysulfide, the alkylborane amine catalyst, the metal oxide catalyst, and the thiuram curing accelerator; and
   combining the polysulfide, the alkylborane amine catalyst, the metal oxide catalyst, and the thiuram curing accelerator to form the dual-curable composition.

20. An article comprising a substrate and a dual-cured sealant disposed thereon formed from the dual-curable sealant composition according to claim 1.

* * * * *